United States Patent
Ponziani (10) Patent No.: US 6,174,016 B1
(45) Date of Patent: Jan. 16, 2001

(54) DOOR ASSEMBLY MODULE AND METHOD

(75) Inventor: Richard L. Ponziani, Centerville, OH (US)

(73) Assignee: Valeo Electrical Systems, Inc., Auburn Hills, MI (US)

(*) Notice: Under 35 U.S.C. 154(b), the term of this patent shall be extended for 0 days.

(21) Appl. No.: 09/418,811

(22) Filed: Oct. 15, 1999

(51) Int. Cl.$^7$ .................................................. B62D 25/00

(52) U.S. Cl. .......................................... 296/56; 296/146.8

(58) Field of Search .................................. 296/146.8, 56, 296/106, 152, 196, 197; 292/43, 201, DIG. 29; 362/497, 498, 499, 488

(56) References Cited

U.S. PATENT DOCUMENTS

| 3,583,021 | 6/1971 | Druseikis . |
| 3,713,472 | 1/1973 | Dozois . |
| 4,119,341 | 10/1978 | Cook . |

(List continued on next page.)

FOREIGN PATENT DOCUMENTS

| 34 06 688 | 9/1985 | (DE) . |
| 38 15 422 | 12/1988 | (DE) . |
| 91 07 295 U | 10/1991 | (DE) . |
| 93 12 684 U | 12/1993 | (DE) . |
| 0 044 649 | 1/1982 | (EP) . |
| 0 111 457 | 6/1984 | (EP) . |

(List continued on next page.)

OTHER PUBLICATIONS

Miscellaneous Tailgate Photographs, 26 sheets, admitted prior art, (No Date).

Primary Examiner—D. Glenn Dayoan
Assistant Examiner—Mickki D. Murray
(74) Attorney, Agent, or Firm—Jacox, Meckstroth & Jenkins (57) ABSTRACT

This invention relates to a system and method for providing a single module which has a plurality of integrally-molded features and components which are mounted on a door of a vehicle. In a preferred embodiment, the module is used to provide a support capable of supporting a plurality of tailgate components, such as a windshield wiper motor, electric door latches and illumination system for illuminating a license plate, stop light and even a cargo area of the vehicle. The system and method provide a module platform having at least one integrally-molded handle which permits an operator to pick up the module with its various components integrally-molded in or mounted thereon and situate the module directly onto the door, thereby substantially reducing the number of assembly steps and assembly time required in the past. The module includes a plurality of molded features such as guide and aligning wedge wings which align the module on the door and which are also capable of housing and securing a plurality of wires. A latch docking station is also integrally-molded into the module to house a plurality of electronic mounting latches during transportation. The one-piece module also has an area for receiving a windshield wiper motor which drives a windshield wiper blade. The module further includes a circuit board which is mounted directly onto the module for controlling the operation of the various electrical components associated with the door. An LED illumination system for illuminating a license plate, stop light and/or even a cargo area of the vehicle is provided directly on the circuit board or is separately wired thereto. Once the components are completely assembled and mounted onto the module, an assembler may pick up the module using a module handle molded in the module at a handle area where a plurality of overturning moments associated with the module are or become substantially balanced to assist the assembler in positioning the module onto the door.

60 Claims, 5 Drawing Sheets

U.S. PATENT DOCUMENTS

| | | |
|---|---|---|
| 4,822,098 | 4/1989 | Vogt et al. . |
| 5,563,483 | 10/1996 | Kowall et al. . |
| 5,621,942 * | 4/1997 | Eustache et al. .................. 15/250.3 |
| 5,694,812 * | 12/1997 | Maue et al. ........................ 74/471 R |
| 5,841,249 * | 11/1998 | Zimmer et al. ......................... 318/10 |
| 5,852,943 * | 12/1998 | Dutka et al. ............................ 70/237 |
| 5,903,114 * | 5/1999 | Miller et al. ........................... 318/10 |
| 5,934,798 * | 8/1999 | Roller et al. .......................... 362/497 |
| 5,947,536 * | 9/1999 | Mizuki et al. ........................ 292/201 |

FOREIGN PATENT DOCUMENTS

| | | |
|---|---|---|
| 0 256 399 | 2/1988 | (EP) . |
| 0 257 608 | 3/1988 | (EP) . |
| 0 506 514 | 9/1992 | (EP) . |
| 94 117 253 | 10/1997 | (EP) . |
| 0 807 734 | 11/1997 | (EP) . |
| 0 881 111 | 12/1998 | (EP) . |
| PCT/GB96/ 00695 | 3/1996 | (WO) . |
| PCT/GB96/ 00718 | 3/1996 | (WO) . |
| PCT/DE97/ 02531 | 10/1997 | (WO) . |

* cited by examiner

DOOR ASSEMBLY MODULE AND METHOD

BACKGROUND OF THE INVENTION

1. Field of Invention

This invention relates to components for a vehicle door and, more particularly, to a door module for supporting a plurality of components for easy installation and mounting onto a door of a vehicle.

2. Description of Related Art

In the field of door assemblies, such as a tailgate door casting, various components are mounted onto the door. Such components may include, for example, a tailgate windshield wiper motor and associated blade. The motor is mounted directly on the tailgate door of the vehicle. Further, to provide a center high mounted stop light as is required by law, a light housing is mounted onto the door. The light housing receives several incandescent or LED devices, and is a separately molded housing mounted directly onto the door using a plurality of screws. When the light bulbs burnt out, they would have to be replaced and such maintenance was dependant upon the useful life of the light bulbs.

The door locking and unlocking mechanisms and linkage was oftentimes expensive and complex. The latch linkage recently has included an electrical actuator which actuates the linkage to unlock the door in response to a mechanical actuation of a door handle. In general, the mechanical latch linkage and electrical actuator would work using a traditional mechanical fork bolt. The unlatch function is achieved when the integrated motor is energized. Motor actuation is achieved when the operator actuates an electrical switch. This signal input is processed through a logic device, such as a microprocessor. Outside inputs to this device instruct whether the tailgate is locked or unlocked. If deemed unlocked, the latch motor is activated.

Unfortunately, the plurality of components which were assembled and mounted onto the door were typically separately shipped to the assembly plant where the components were each separately mounted onto the door. Thus, for example, the incandescent light assembly, windshield wiper motor, door unlock and lock linkage and electric actuator and the like would all be separately mounted directly onto the door. After these components were separately shipped to the assembly plant. Various other components would also be separately mounted onto the door, such as a license plate light socket assembly and/or cargo bay light socket assembly.

Another problem with the prior art systems is that they typically required numerous skilled assemblers to assemble and mount the various pieces onto the door of the vehicle.

What is needed, therefore, is a system and method which can facilitate reducing the assembly time and reduce the manufacturing and assembly steps required during the manufacture and assembly of a door of a vehicle.

SUMMARY OF THE INVENTION

It is, therefore, a primary object of the invention to provide a system and method which facilitates reducing the assembly time required during the assembly of a door.

Another object of the invention is to provide an assembly module comprising an integrally-molded platform having a module assembly handle which is situated at an area of the platform such that any overturning moments for the various components which are either molded into or mounted on the module are substantially balanced such that an operator can easily hold and position the module onto a door.

Another object of the invention is to provide a module having a plurality of aligning guides or wedge wings which facilitate the alignment and mounting of the module onto the door.

Another object of the invention is to provide a module having a docking station for docking one or more pre-wired and tested latches during transportation and which can be easily removed from the docking station so that they can be mounted onto the door where desired.

Another object of the invention is to provide wire receiving areas integrally-molded into the module for receiving and housing various wires during transportation, as well as after the module is mounted onto the door.

Another object of the invention is to provide a module which is capable of receiving a windshield wiper motor.

Another object of the invention is to provide a control or circuit board mounted directly onto the module for controlling the operation of the various electrical components associated with the door, as well as providing an illumination system for illuminating a stop light, license plate and, if desired, a cargo area of the vehicle.

Another object of the invention is to provide a circuit board having switch control logic for controlling the operation of a plurality of electrical latch mechanisms in response to the actuation of a handle.

Another object of the invention is to provide a module having an integrally-molded door handle which, when actuated, engages a switch on the circuit board to unlock the door in accordance with logic rules established by the switch control logic.

Still another object of the invention is to provide an integral one-piece molded construction having guide or wedge wings, module and door handles and a docking station integrally-molded in a one-piece molded construction and further capable of receiving the various other components such as a windshield wiper motor and circuit boards.

Yet another object of the invention is to provide a system and method for assembling a plurality of components onto a module.

Another object of the invention is to provide a module having a plurality of components mounted thereon and which can be aligned and mounted directly onto a door during assembly, thereby reducing the need for separately mounting a plurality of parts onto the door.

In one aspect, this invention comprises an automotive assembly module comprising an automotive module having a handling area, the handling area defining an area where the module may be handled for installation; a handle situated at the handling area for permitting a user to grab the module during an installation procedure; the automotive module having a center of gravity associated with the handling area at which a plurality of weight-overturning moments are substantially balanced. It would subsequently be covered by an interior trim panel.

In another aspect, this invention comprises an automotive assembly module comprising an automotive module having a handling area, the handling area defining an area where the module may be handled for installation; a handle situated at the handling area for permitting a user to grab the module during an installation procedure; the automotive module having a center of gravity associated with the handling area at which a plurality of weight-overturning moments are substantially balanced.

In still another aspect, this invention comprises a method of providing a plurality of components on a door of an automobile comprising the steps of providing a module having a handling area defining an area where the tailgate module may be handled for installation; and providing a handle situated at the handling area for permitting a user to grab the module during an installation procedure so that the module can be situated on an automobile or part thereof; wherein the module having a center of gravity associated with the handling area at which a plurality of weight-overturning moments are substantially balanced.

In yet another aspect, this invention comprises an automotive assembly module for mounting on a door of a vehicle comprising: a platform module; a circuit board mounted on the module, the circuit board comprising a stop light mounted thereon and a microprocessor coupled to selected lighting elements of the stop light for controlling the operation of the stop light, the microprocessor being capable of flashing the stop light before the stop light is fully actuated, the circuit board further comprising an illuminating system for illuminating either a license plate mounted on the door or a cargo area of said vehicle; a heater grid plug mounted on the circuit board for electrically coupling a heater grid associated with glass on the door to a circuit on the circuit board; a latch docking area for detachably supporting docking latches to be installed on the door of the automobile; at least one guide for aligning the module on said door; a wire storage system for storing wires during transit of said module; a module handle situated on the module for permitting a user to grab the module during an installation procedure; the automotive module having a center of gravity associated with the handling area at which a plurality of weight-overturning moments are substantially balanced; and a door actuation handle integrally-molded in the module.

In another aspect, this invention comprises a method of mounting a plurality of components on a door of an automobile comprising the steps of providing a module for mounting on the door, the module comprising a wiper motor and at least one of the following components: an electric door latch, circuit board, license plate illuminator, stop light, heater grid plug or cargo area illuminator; and providing a handle on the module for permitting a user to grab the module and mount the module on the automobile.

Another aspect comprises a license plate illumination method using white colored LEDs. This eliminates the need for means to replace bulbs, as in the case of using traditional incandescent bulbs. This also eliminates the need to electrically connect the license plate lighting to the lighting circuit, instead making the connection through the vehicle ignition, already available in the module, thereby saving wiring.

Finally, in another aspect, this invention comprises an automotive assembly module comprising a module platform for mounting on a door of an automobile; and a plurality of module components either mounted on or integrally formed in the module; the module facilitating mounting of the plurality of components onto said door of the automobile.

Other objects and advantages of the invention will be apparent from the following description, the accompanying drawings, and the appended claims.

DETAILED DESCRIPTION OF THE PREFERRED EMBODIMENT

Figure 1:
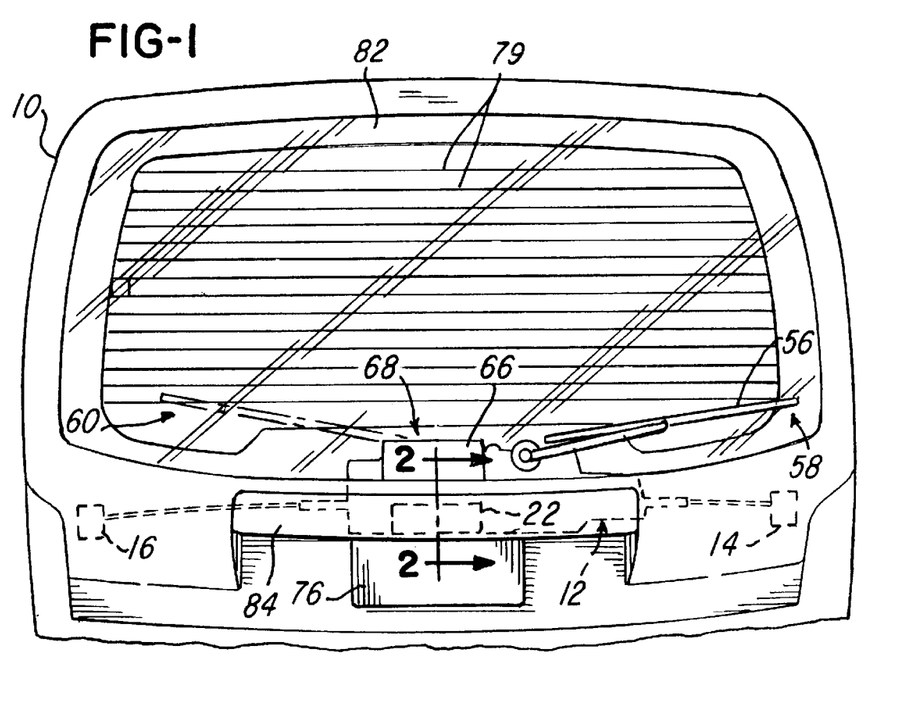
FIG. 1 is a fragmentary view of a vehicle showing a rear tailgate door having a module of the present invention mounted thereon.

Referring now to FIG. 1, a tailgate 10 of an automobile is shown. In the embodiment being described, the tailgate 10 comprises an automotive assembly module 12 (FIGS. 3 and 4) comprising a molded platform 48 on which a plurality of components capable of performing a plurality of functions are mounted thereon. In the embodiment being described, the assembly 12 comprises a plurality of electronic door latches 14 and 16 which are, ultimately, secured to the door 10 using flanges 14a and 16a, respectively. The electric door latches 14 and 16 are under the control of a circuit board 18 and switch control logic which lock and unlock the door 10. In the embodiment being described, suitable latches 14 and 16 are model number 100510 available from Value Security Systems of France. The unlocking process will be described later herein.

Figure 2:
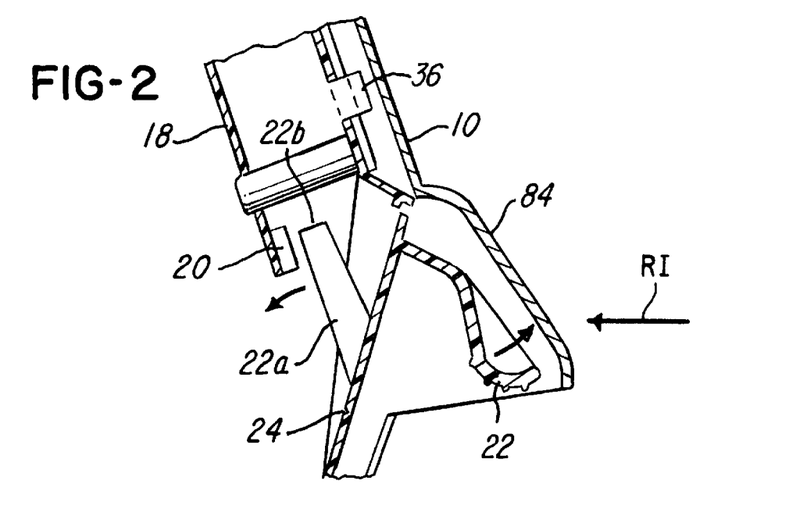
FIG. 2 is a fragmentary sectional view taken along the line 2—2 in FIG. 1.
Figure 3:
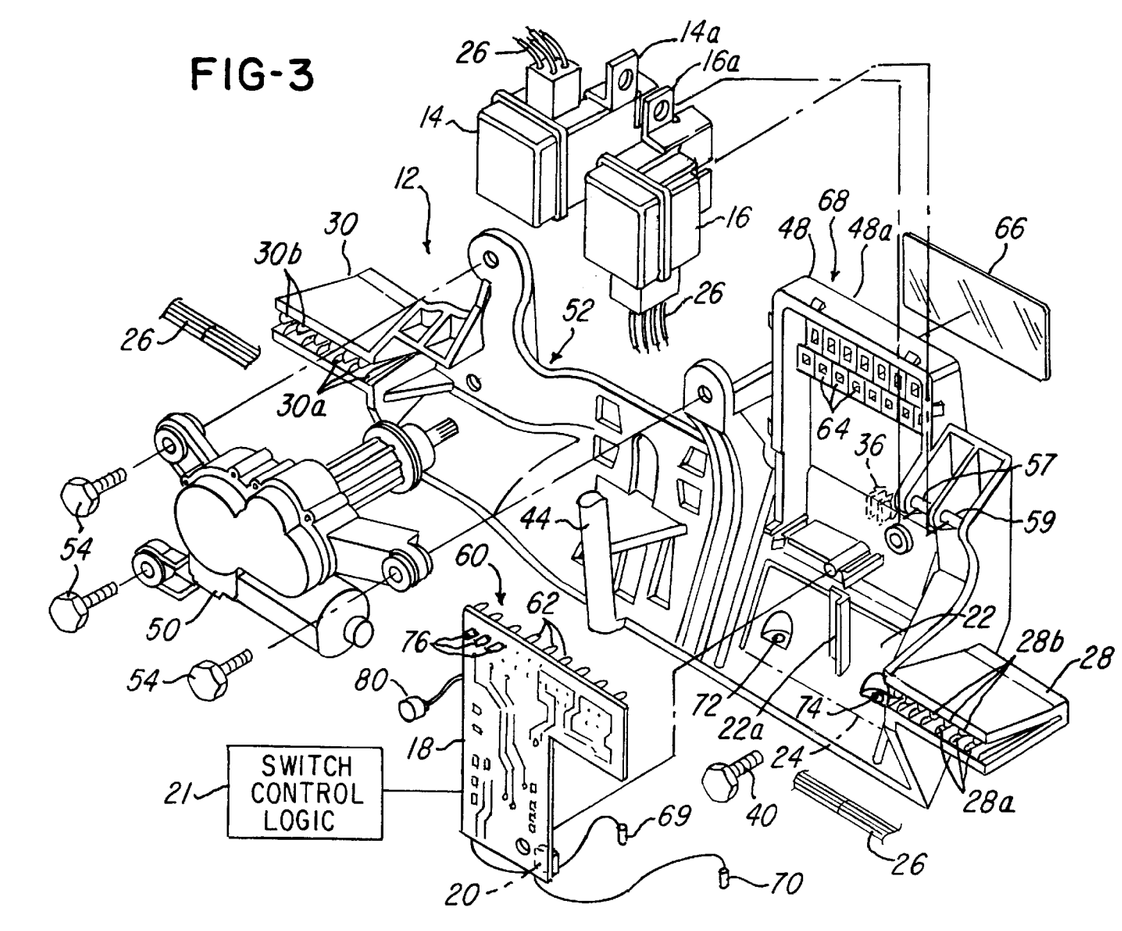
FIG. 3 is an exploded view of a one-piece molded platform having a plurality of components.
Figure 4:
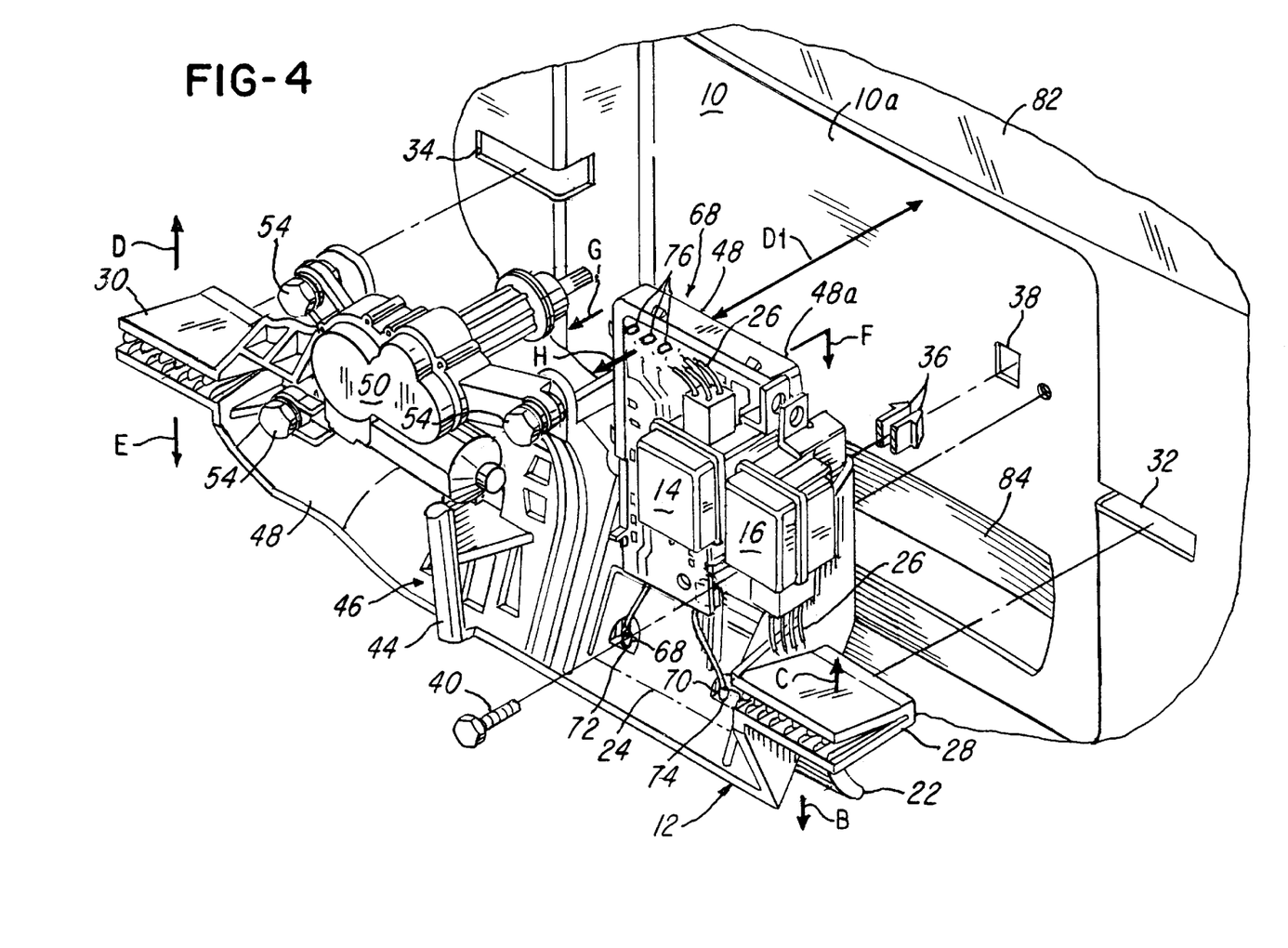
FIG. 4 is a fragmentary view of the assembly module shown in FIG. 3 as assembled and as positioned in operative relationship with the inner surface of the door shown in FIG. 1.

As best illustrated in FIGS. 3 and 4, the module 12 comprises the circuit board 18 which contains various circuits for controlling the various electrical components mounted on the door 10. In the embodiment being described and as best illustrated in FIG. 2, the circuit board 18 comprises a switch 20 which, when actuated, energizes latches 14 and 16 in accordance with switch control logic 21 on circuit board 18. In order to actuate the switch 20, the module 12 comprises a door handle 22 (FIGS. 2–4) having a switch actuator 22a having an end 22b (FIG. 2) which engages switch 20 when the door handle is pivoted to an open door position in the direction of arrow A in FIG. 2. In this regard, the handle 22 is integrally-molded into module 12 and has an associated line of weakness 24 (FIGS. 3 and 4) so that the handle 22 may be easily pivoted from a home or locked position, as shown in FIG. 2, to an open switch actuated position wherein end 22b engages and actuates switch 20. The circuit board 18 comprises the switch or control logic 20 which defines the logic for energizing latches 14 and 16. For example, when an interior tailgate unlock switch is actuated by an operator of the vehicle and the door handle 22 is actuated such that the end 22b engages switch 20, then the latches are energized and cause the door 10 to become unlocked so that it can be opened for access to a cargo or passenger area (not shown) of the vehicle.

If the operator of the vehicle fails to actuate the interior tailgate door unlock switch then, when the handle 22 is actuated in the direction of arrow A in FIG. 2, the switch control logic 20 on circuit board 18 does not energize locks 14 and 16. In the embodiment being described, the switch control logic 20 may comprise logic to permit an operator to directly energize the latches 14 and 16 to unlock the door without actuation of the handle 22 if desired.

Notice that the circuit board 18 is coupled to the latches 14 and 16 via a plurality of wires 26. As best illustrated in FIG. 3, the module 12 further comprises a plurality of wedge wings 28 and 30 which are integrally-molded into the module and which define wedge areas 28a and 30a, respectively, for receivably securing or storing wires 26 to the module 12 during transportation and after the module 12 is mounted to the door 10. Notice in FIGS. 3 and 4 that the wedge wings 28 and 30 are generally V-shaped in cross section and are received in a plurality of openings 32 and 34 (FIG. 4) of tailgate 10. Because the platform 48 is an integral molded one-piece plastic construction, it may be desirable to provide a gap or distance D1 (FIG. 4) between wall 10a of door 10 and face 48a of platform 48 so that when a screw 40 is tightened, the wedge wings 28 and 30 become press fit and taut in apertures 32 and 34. The face 48a of platform 48 also is driven towards inner surface 10a of door 10 and torques as screw 40 is tightened to snugly secure the module 12 to the door 10. Thus, when the module 12 is mounted on the door 10, the wedge wings 28 and 30 are received in openings 32 and 34, respectively, and either press or force fit until taut. The module 12 comprises a plurality of detents 36 (FIG. 4) which are received in opening 38 to lock the module 12 to the door 10. In the embodiment being described, the wedge wings 28 and 30 comprise a plurality of staggered ribs 28b and 30b, respectively, which cooperate to provide the wire receiving areas 28a and 30a mentioned earlier herein. A screw 40 may also be used to fasten the module 12 to the door 10.

It should be appreciated that the wedge wings 28 and 30 facilitate aligning the module 12 onto door 10 so that the module 12 can be easily aligned and mounted onto the door 10 during installation. In order to facilitate handling, a module handle 44 is provided as an integrally-molded part of module 12. The module handle 44 is situated at a handling area 46 of module 12. The module handle 44 permits a user to grab the module handle 44 during installation. In order to facilitate installation onto door 10, the module handle 44 is situated at the handling area 46 such that, when all the components of the module 12 are mounted on the module 12, the module handle 44 is situated at a position where a center of gravity of the module 12 is substantially balanced so that a plurality of weight overturning moments, such as the moments illustrated by arrows B, C, D, E, F and G, are substantially balanced. This facilitates permitting an assembler to simply grab handle 44 and easily maneuver and position module 12 relative to the door 10 and so that wings 28 and 30 are received and press fit into apertures 32 and 34, respectively.

In the embodiment being described the wedge wings 28 and 30, door handle 22 and module handle 44 are an one-piece molded construction integrally-molded into platform 48 of module 12.

In the embodiment being described and as best illustrated in FIGS. 3 and 4, the module 12 further comprises a wiper motor 50 which is mounted onto module 12 at a wiper motor receiving area 52 using bolts 54. The wiper motor 50 drives a wiper blade 56 (FIG. 1) from an inwipe position 58 to an outwipe position 60. The wiper motor 50 is electrically coupled to and powered by the circuit board 18 which comprises a wiper control circuit 19 (not shown) for controlling the operation of the wiper motor 50. The microprocessor (not shown) on circuit board 18 may be programmed for controlling operation of the wiper motor 50.

The platform 48 of module 12 further comprises a plurality of integrally-molded docking posts 56 and 58 for receiving lock mechanisms 14 and 16, respectively. In this regard, the latch mechanisms 14 and stored 16 both comprise latches (not shown) which are seated and stored on the docking posts 57 and 59 during transportation. When it is desired to mount the latches 14 and 16 to the door 10, as illustrated in FIG. 1, then the latches 14 and 16 are removed from the docking posts 57 and 59, respectively, and mounted at their respective positions on the door 10.

In the embodiment being described, the circuit board 18 comprises an illumination system 60 comprising a plurality of light emitting diodes (LEDs) 62 which generate light through a plurality of openings 64 and through reflector 66 which in the embodiment being described is red and is mounted on platform 48. Notice that the platform 48 of module 12 is thus capable of providing a center high mounted stop light area 68 which cooperates with the LEDs 62 on circuit board 18 to provide a center high mounted stop light on the door 10, as best illustrated in FIGS. 1, 3 and 4.

The illuminating system 60 may further comprise a pair of light emitting diodes 69 and 70 either hand wired to or mounted on circuit board 18 which provide illumination through openings 72 and 74 in handle 22 (FIGS. 3 and 4) which illuminates a license plate 76 (FIG. 1).

In the embodiment being described, the circuit board 18 comprises the above-mentioned microprocessor and suitable memory (not shown) which are coupled to and control the operation of the LEDs to provide stop light illumination and license plate illumination in response to the operation of the vehicle by an operator. Also, the microprocessor can energize the LEDs 62, 69 and 70 so that the lights can be flashed on and off, for example, in a first actuation or in an emergency situation or to provide illumination to a cargo area (not shown) of the vehicle 10 as desired. In this regard, the circuit board 18 may have cargo LEDs (not shown) mounted on or coupled to the circuit board to facilitate illuminating the cargo area of the vehicle when, for example, a cargo area light switch (not shown) is actuated to an "on" position. For example, the circuit board 18 may comprise a plurality of LEDs 76 which provide illumination in the direction of arrow H in FIG. 4 to illuminate the cargo area of the vehicle.

A method of mounting a plurality of components on the door 10 car be described as providing the module 12 having the platform 48 with a plurality of components either mounted on or integrally-molded as part of the assembly 12 as described earlier. The method further comprises the steps of providing a windshield wiper motor 50 mounted on the module 12 with the bolts 54, the electric door latches 14 and 16 detachably mounted on the docking posts 57 and 59, respectively. The circuit board 18 is also mounted on the platform 48 prior to installing using conventional means such as screws (not shown) such that the LEDs 62, 69 and 70 described earlier herein become operatively aligned with the opening 64, 72 and 74. The wiper motor 50, latches 14 and 16, reflector 66, and circuit board 18 are mounted directly on the platform 48, and the other components are integrally-molded as a one-piece molded construction. Notice that the reflector 66 is situated on a face 48a of platform 48 using a suitable adhesive or fasteners.

The circuit board 18 may further comprise a heater plug 80 and a heater control circuit (not shown) for coupling to a conventional heating grid 19 (FIG. 1) which is used to defrost window 82.

Thus, it should be appreciated that what was once a plurality of components separately assembled onto a door may be provided in a convenient one-piece assembly with all the components either mounted or integrally-molded thereon. The circuit board 18 may be optionally coupled to and programmed to control the operation of the components.

Various advantages to this assembly include the ability to provide a one-piece module 12 assembly which can be properly and quickly aligned using the wedge wings 28 and 30 in cooperation with the apertures 32 and 34, respectively. Once aligned, the center high mounted stop light comprising the LEDs 62 are properly positioned in association with the opening 64, reflector 66 and window 82 of the door 10.

The latches 14 and 16 are conveniently stored during transit on the docking posts 57 and 59. Once the module 12 is mounted onto door 10 using detents 36 and screw 40, the assembler is free to remove the lock mechanisms 14 and 16 and mount them onto the door 10, as shown in FIG. 1.

Figure 5:
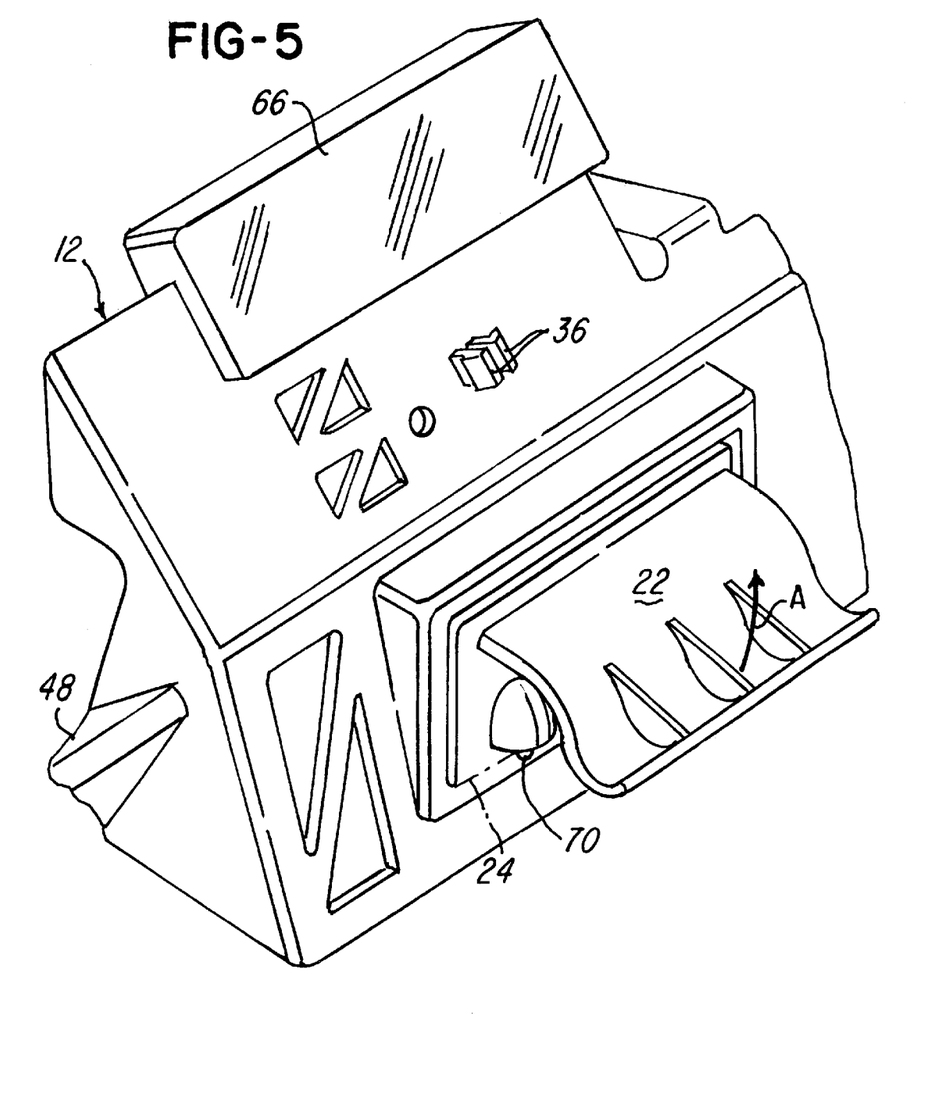
FIG. 5 is a fragmentary view showing various details of the door handle shown in FIGS. 1–4.
Figure 6:
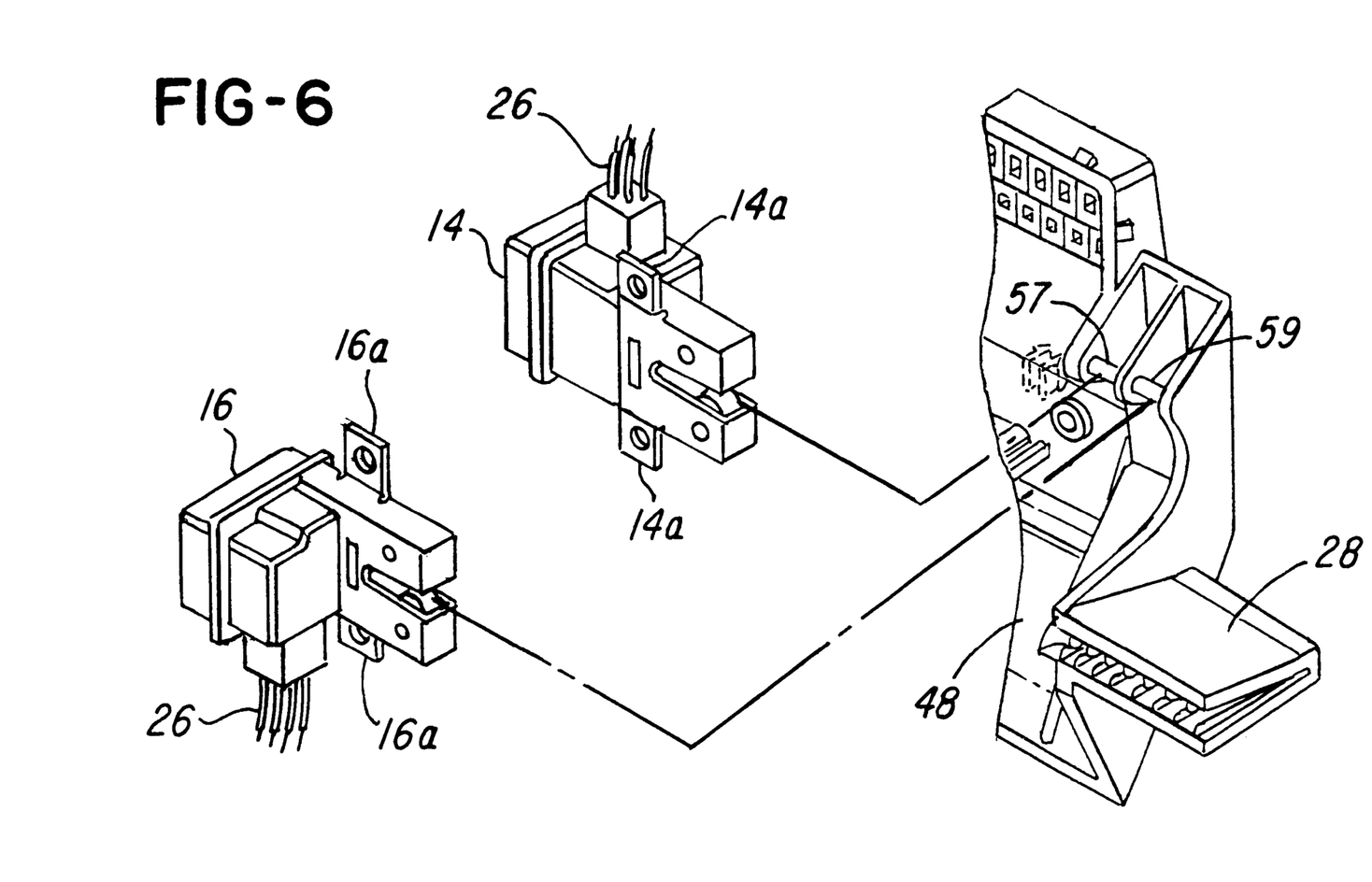
FIG. 6 is a fragmentary exploded view of the latch mechanisms, showing mounting means to the docking posts.

As mentioned earlier, the invention further comprises the convenient one-piece door handle 22 molded directly into platform 48 of module 12 so that when the handle 22 is actuated in the direction of arrow A (FIGS. 2 and 5), the end 22*b* engages switch 20 on circuit board 18 to electronically actuate latches 14 and 16 as controlled by the switch control logic 20 on circuit board 18.

It should also be appreciated that the illumination system 60 provides permanent illumination under the control of microprocessor or circuit board 18 so that the license plate 76 (FIG. 1) and the stop light reflector 66 may be illuminated when appropriate. Advantageously, the use of the LEDs on the circuit board 18 provide long-lasting light which reduces or eliminates the need for replacement incandescent light bulbs as is required in many of the illumination systems of the past.

In the embodiment being described, the illumination system and aforementioned LEDs 62, 68, 70 and 76 may all be placed under microprocessor control so that they can be powered and controlled either directly from circuit board 18 or directly wired to the vehicle ignition system which, in turn, eliminates the need for separate wiring to, for example, a light socket which receives incandescent lights.

It should be appreciated that the circuit board 18 may be coupled to the ignition system or electronic control system of the vehicle and provides microprocessor controlled operation for the illumination system, wiper motor 50 and latches 14 and 16, although other operations may be controlled by the circuit board 18 such as the energization of the heating grid 79 via plug 80.

Once the module 12 is mounted onto door 10, an aesthetically pleasing interior door cover (not shown) is mounted on the cover to hide the module 12 and its components. Notice also that the handle 22 extends through the door 10 and is covered by a door handle cover 84 (FIGS. 1 and 2) so that the handle 22 is not visible when viewed at the level or in the direction of, for example, arrow RI in FIG. 2.

Advantageously, many of the mechanical logic and latch linkage required by door assemblies of the prior art are eliminated which, in turn, eliminates several of the assembly steps and maintenance problems associated with the latch mechanisms known by the prior art. Also, the one-piece molded module 12 provides a convenient platform for holding a plurality of components in a balanced manner so that they can be easily transported. Once the module 12 is molded and the various components are mounted thereon, the assembly can be easily positioned on the door 10 and fastened to the door 10.

In the embodiment being described, the circuit board 18, switch control logic 21 and associated microprocessor (not shown) and memory (not shown) and illumination system 60 are available on a one-piece circuit board available from Valeo Electrical Systems, Inc. currently of Dayton, Ohio who is the assignee of the present invention.

While the forms of apparatus herein described constitute preferred embodiments of the invention, it is to be understood that this invention is not limited to these precise forms of apparatus, and that changes may be made therein without departing from the scope of the invention which is defined in the appended claims.

What is claimed is:

1. An automotive assembly module comprising:
   an automotive module having a handling area, said handling area defining an area where said module may be handled for installation; and
   a handle situated at said handling area for permitting a user to grab said module during an installation procedure; said automotive module having a center of gravity associated with said handling area at which a plurality of weight-overturning moments are substantially balanced.

2. The automotive assembly module as recited in claim 1 wherein said handle is integrally-molded into said automotive module.

3. The automotive assembly module as recited in claim 1 wherein said handle is integrally formed on said module at said handling area such that said handle is not visible after said module is situated on said automobile.

4. The automotive assembly module as recited in claim 1 wherein said automotive module comprises at least one motor mounted on said automotive module.

5. The automotive assembly module as recited in claim 4 wherein said at least one motor is a windshield wiper motor.

6. The automotive assembly module as recited in said claim 3 wherein said automotive module is a tailgate assembly module.

7. The automotive assembly module as recited in claim 6 wherein said tailgate assembly comprises at least one motor mounted on said automotive module.

8. The automotive assembly module as recited in claim 6 wherein said at least one motor comprises a power hatch closer.

9. A method of providing a plurality of components on a door of an automobile comprising the steps of:
   providing a module having a handling area defining an area where said tailgate module may be handled for installation; and
   providing a handle situated at said handling area for permitting a user to grab said module during an installation procedure so that said module can be situated on an automobile or part thereof;
   wherein said module having a center of gravity associated with said handling area at which a plurality of weight-overturning moments are substantially balanced.

10. The method as recited in claim 9 wherein said method further comprises the step of:
   providing a handle that is integrally-molded into said module.

11. The method as recited in claim 9 wherein said method further comprises the step of:
   providing at least one motor mounted on said module.

12. The method as recited in claim 11 wherein said method further comprises the step of:
   providing a windshield wiper motor on said module.

13. An automotive assembly module for mounting on a door of a vehicle comprising:
   a platform module;
   a circuit board mounted on said module, said circuit board comprising a stop light mounted thereon and a microprocessor coupled to said stop light for controlling the operation of said stop light, said microprocessor being capable of flashing said stop light before said stop light is fully actuated, said circuit board further comprising an illuminating system for illuminating either a license plate mounted on said door or a cargo area of said vehicle;

a heater grid plug mounted on said circuit board for electrically coupling a heater grid associated with glass on said door to a circuit on said circuit board;

a latch docking area for detachably supporting docking latches to be installed on said door of the automobile;

at least one guide for aligning said module on said door;

a wire storage system for storing wires during transit of said module;

a module handle situated on said module for permitting a user to grab said module during an installation procedure; said automotive module having a center of gravity associated with said handling area at which a plurality of weight-overturning moments are substantially balanced; and a door actuation handle integrally-molded in said module.

14. The automotive assembly module as recited in claim 13 wherein said module handle is integrally-molded into said module.

15. The automotive assembly module as recited in claim 13 wherein said tailgate assembly comprises a windshield wiper motor mounted on said module.

16. The automotive assembly module as recited in claim 13 wherein said at least one guide comprises a wedge wing, said door comprising at least one wedge wing aperture for receiving said wedge wing to facilitate aligning and securing said module on said door.

17. The automotive assembly module as recited in claim 13 wherein said module comprises a reflective material for reflecting light generated by said illuminating system.

18. The automotive assembly module as recited in claim 13 wherein said illuminating system comprises a plurality of LED's mounted on said circuit board.

19. The automotive assembly module as recited in claim 13 wherein said wire storage system is generally V-shaped in cross section and comprises a plurality of wing receiving apertures.

20. The automotive assembly module as recited in claim 13 wherein said at least one wedge wing is integrally-molded in said module.

21. A method of mounting a plurality of components on a door of an automobile comprising the steps of:

providing a one-piece module for mounting on said door, said one piece module comprising a wiper motor and at least one of the following components: an electric door latch, circuit board, license plate illuminator, stop light, heater grid plug or cargo area illuminator; and providing at least one separate handle on said one piece module for permitting a user to grasp said one piece module and mount said one piece module on the automobile, said at least one separate handle comprising a gripping member integrally molded into said one piece module.

22. The method as recited in claim 21 wherein said method further comprises the step of:

providing a handle integrally-molded into said module.

23. A method of mounting a plurality of components on a door of an automobile comprising the steps of:

providing a module for mounting on said door, said module comprising a wiper motor and at least one of the following components: an electric door latch, circuit board, license plate illuminator, stop light, heater grid plug or cargo area illuminator;

providing a handle on said module for permitting a user to grab said module and mount said module on the automobile; and wherein said module is a tailgate assembly and said components are tailgate components.

24. The method as recited in claim 23 wherein said method further comprises the step of:

providing said at least one wiper motor mounted directly on said module.

25. The method as recited in claim 23 wherein said method further comprises the step of:

providing a circuit board mounted on said module.

26. A method of mounting a plurality of components on a door of an automobile comprising the steps of:

providing a module for mounting on said door;

providing a handle on said module for permitting a used to grab said module and mount said module on the automobile;

providing a circuit board mounted on said module; and providing a license plate illuminator mounted on said circuit board for illuminating a license plate after said module is mounted on said door.

27. A method of mounting a plurality of components on a door of an automobile comprising the steps of:

providing a module for mounting on said door;

providing a handle on said module for permitting a user to grab said module and mount said module on the automobile;

providing a circuit board mounted on said module; and providing a license plate illuminator mounted on said circuit board for illuminating said cargo area after said module is mounted on said door.

28. A method of mounting a plurality of components on a door of an automobile comprising the steps of:

providing a module for mounting on said door, said module comprising a wiper motor and at least one of the following components: an electric door latch, circuit board, license plate illuminator, stop light, heater grid plug or cargo area illuminator; and providing a handle on said module for permitting a user to grab said module and mount said module on the automobile;

wherein said method further comprises the step of: providing at least one integrally-molded guide for aligning said module on said door when said module is mounted thereon.

29. A method of mounting a plurality of components on a door of an automobile comprising the steps of:

providing a module for mounting on said door, said module comprising a wiper motor and at least one of the following components: an electric door latch, circuit board, license plate illuminator, stop light, heater grid plug or cargo area illuminator; and providing a handle on said module for permitting a user to grab said module and mount said module on the automobile;

wherein said method further comprises the step of:

providing a latch docking area integrally formed in said module for supporting a plurality of latches and said module.

30. A method of mounting a plurality of components on a door of an automobile comprising the steps of:

providing a module for mounting on said door, said module comprising a wiper motor and at least one of the following components: an electric door latch, circuit board, license plate illuminator, stop light, heater grid plug or cargo area illuminator;

providing a handle on said module for permitting a user to grab said module and mount said module on the automobile; and wherein said method further comprises the step of:

providing a module comprising at least one wire storage system for storing wires during transit of said module.

31. A method of mounting a plurality of components on a door of an automobile comprising the steps of:

providing a module for mounting on said door, said module comprising a wiper motor and at least one of the following components:

an electric door latch, circuit board, license plate illuminator, stop light, heater grid plug or cargo area illuminator;

providing a handle on said module for permitting a user to grab said module and mount said module on the automobile;

wherein said method further comprises the step of:

providing a module comprising at least one guide for aligning said module on said door during a mounting operation when said module is mounted on said door.

32. An automotive assembly module comprising:

a one-piece module platform for mounting on a door of an automobile;

a plurality of module components either mounted on or integrally formed in said one-piece module platform; said one-piece module platform facilitating mounting of said plurality of components onto said door of said automobile; and said one-piece module platform providing a separate handle for permitting a user to grasp said one-piece module platform, said platform separate handle comprising a gripping member integrally molded into said one-piece module platform.

33. The automotive assembly module as recited in claim 32 wherein said plurality of module components comprises a module handle integrally-molded into said module platform.

34. The automotive assembly module as recited in claim 32 wherein said plurality of module components comprises at least one motor mounted on said module platform.

35. The automotive assembly module as recited in claim 34 wherein said at least one motor is a windshield wiper motor.

36. The automotive assembly module as recited in claim 32 wherein said plurality of module components comprises a circuit board mounted directly on said module platform.

37. An automotive assembly module comprising:

a module platform for mounting on a door of an automobile;

a plurality of module components either mounted on or integrally formed in said module; said module facilitating mounting of said plurality of components onto said door of said automobile;

wherein said plurality of module components comprises a circuit board mounted directly on said module platform;

wherein said circuit board comprises a plurality of lights mounted thereon for illuminating a license plate on said door when said module platform is mounted on said door.

38. An automotive assembly module comprising:

a module platform for mounting on a door of an automobile; and a plurality of module components either mounted on or integrally formed in said module; said module facilitating mounting of said plurality of components onto said door of said automobile;

wherein said plurality of module components comprises a circuit board mounted directly on said module platform; and wherein said circuit board comprises a plurality of lights mounted thereon for illuminating a cargo area of said automobile.

39. An automotive assembly module comprising:

a module platform for mounting on a door of an automobile;

a plurality of module components either mounted on or integrally formed in said module; said module facilitating mounting of said plurality of components onto said door of said automobile; and wherein said plurality of module components comprises at least one wedge wing integrally-molded in said module platform, said at least one wedge wing facilitating aligning said module platform or said door.

40. An automotive assembly module comprising:

a module platform for mounting on a door of an automobile;

a plurality of module components either mounted on or integrally formed in said module; said module facilitating mounting of said plurality of components onto said door of said automobile; and wherein said plurality of module components comprises at least one latch detachably mounted at a latch docking area of said module platform.

41. An automotive assembly module comprising:

a module platform for mounting on a door of an automobile;

a plurality of module components either mounted on or integrally formed in said module; said module facilitating mounting of said plurality of components onto said door of said automobile; and wherein said plurality of module components comprises a wire storage system integrally-molded into said module platform.

42. An automotive assembly module comprising:

a module platform for mounting on a door of an automobile;

a plurality of module components either mounted on or integrally formed in said module; said module facilitating mounting of said plurality of components onto said door of said automobile; and wherein said plurality of module components comprises at least one wedge wing integrally-molded in said module platform.

43. An automotive assembly module comprising:

a module platform for mounting on a door of an automobile;

a plurality of module components either mounted on or integrally formed in said module; said module facilitating mounting of said plurality of components onto said door of said automobile; and wherein said plurality of module components comprises a circuit board comprising a stop illuminator for generating a stop light.

44. An automotive assembly module comprising:
a module platform for mounting on a door of an automobile;
a plurality of module components either mounted on or integrally formed in said module; said module facilitating mounting of said plurality of components onto said door of said automobile; and
wherein said plurality of module components comprises a stop reflector mounted thereon.

45. The automotive assembly module as recited in claim 43 wherein said circuit board comprises a microprocessor coupled to said stop illuminator for intermittently energizing said stop illuminator when a brake pedal of said automobile is depressed to stop the automobile before said stop illuminator is fully energized.

46. An automotive assembly module comprising:
a module platform for mounting on a door of an automobile;
a plurality of module components either mounted on or integrally formed in said module; said module facilitating mounting of said plurality of components onto said door of said automobile; and
wherein said plurality of module components comprises a door handle integrally-molded in said module platform for unlatching said door.

47. The automotive assembly module as recited in claim 46 wherein said module comprises a circuit board attached thereto, said circuit board comprising a door release switch and being operatively positioned relative to said handle such when said door handle is actuated to an unlock position, said door release switch is actuated to unlock said door.

48. An automotive assembly module comprising:
a module platform for mounting on a door of an automobile;
a plurality of module components either mounted on or integrally formed in said module; said module facilitating mounting of said plurality of components onto said door of said automobile;
wherein said plurality of module components comprises a module handle integrally-molded into said module platform; and
wherein said module platform is a one-piece molded construction.

49. An automotive assembly module comprising:
a module platform for mounting on a door of an automobile;
a plurality of module components either mounted on or integrally formed in said module; said module facilitating mounting of said plurality of components onto said door of said automobile;
wherein said plurality of module components comprises a module handle integrally-molded into said module platform; and
wherein said plurality of module components comprises at least one motor mounted on said module platform.

50. The automotive assembly module as recited in claim 49 wherein said at least one motor is a windshield wiper motor.

51. An automotive assembly module comprising:
a module platform for mounting on a door of an automobile;
a plurality of module components either mounted on or integrally formed in said module; said module facilitating mounting of said plurality of components onto said door of said automobile;
wherein said plurality of module components comprises at least one motor mounted on said module platform; and
wherein said plurality of module components comprises a module handle integrally-molded into said module platform.

52. The automotive assembly module as recited in claim 51 wherein said plurality of module components comprises a circuit board mounted on said module platform.

53. The automotive assembly module as recited in claim 52 wherein said circuit board comprises a plurality of lights mounted thereon for illuminating a license plate on said door.

54. The automotive assembly module as recited in claim 52 wherein said circuit board comprises a plurality of lights mounted thereon for illuminating a cargo area of said automobile.

55. The automotive assembly module as recited in claim 53 wherein said plurality of module components comprises at least one wedge wing integrally-molded in said module platform, said at least one wedge wing facilitating mounting said module to said door.

56. The automotive assembly module as recited in claim 54 wherein said plurality of module components comprises at least one latch detachably mounted on said module.

57. The automotive assembly module as recited in claim 53 wherein said plurality of module components comprises a wire storage system integrally-molded into said module.

58. The automotive assembly module as recited in claim 57 wherein said plurality of module components comprises at least one wedge wing integrally-molded in said module.

59. An automotive assembly module comprising:
a module platform for mounting on a door of an automobile;
a plurality of module components either mounted on or integrally formed in said module; said module facilitating mounting of said plurality of components onto said door of said automobile;
wherein said plurality of module components comprises at least one motor mounted on said module platform; and
wherein said plurality of module components comprises a circuit board comprising a stop illuminator for generating a stop light.

60. The automotive assembly module as recited in claim 59 wherein said plurality of module components comprises a stop reflector mounted thereon.

* * * * *